(12) United States Patent
Shimazaki et al.

(10) Patent No.: US 8,255,725 B2
(45) Date of Patent: Aug. 28, 2012

(54) INFORMATION PROCESSING APPARATUS AND POWER-SAVING CONTROL METHOD

(75) Inventors: Yasuhito Shimazaki, Ome (JP); Naoki Fujiwara, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 317 days.

(21) Appl. No.: 12/703,676

(22) Filed: Feb. 10, 2010

(65) Prior Publication Data

US 2010/0275046 A1    Oct. 28, 2010

(30) Foreign Application Priority Data

Apr. 28, 2009    (JP) .................................. 2009-109799

(51) Int. Cl.
 *G06F 1/32* (2006.01)
(52) U.S. Cl. ........................ 713/323; 713/320
(58) Field of Classification Search .................. 713/320, 713/323
 See application file for complete search history.

(56) References Cited

U.S. PATENT DOCUMENTS

| | | | | | |
|---|---|---|---|---|---|
| 5,511,205 | A | * | 4/1996 | Kannan et al. | 713/324 |
| 5,991,841 | A | * | 11/1999 | Gafken et al. | 710/104 |
| 6,148,345 | A | * | 11/2000 | Yamaki | 709/253 |
| 6,711,692 | B1 | * | 3/2004 | Maeda et al. | 713/324 |
| 2004/0078663 | A1 | * | 4/2004 | Inaba | 714/22 |
| 2006/0288245 | A1 | * | 12/2006 | Lee | 713/320 |
| 2007/0064955 | A1 | | 3/2007 | Saito | |
| 2009/0119526 | A1 | * | 5/2009 | Liu et al. | 713/323 |

FOREIGN PATENT DOCUMENTS

| | | |
|---|---|---|
| JP | 05-284197 | 10/1993 |
| JP | H05-284197 | 10/1993 |
| JP | 2001-517834 | 10/2001 |
| JP | 2002-236529 | 8/2002 |
| JP | 2006-514771 | 5/2006 |
| JP | 2007-004600 | 1/2007 |
| JP | 2007-172062 | 7/2007 |
| JP | 2007-179225 | 7/2007 |
| JP | 2008-171389 | 7/2008 |
| JP | 2008-305195 | 12/2008 |
| WO | WO 99/15971 | 4/1999 |
| WO | WO 2004/095298 | 11/2004 |

* cited by examiner

*Primary Examiner* — Chun Cao
(74) *Attorney, Agent, or Firm* — Knobbe, Martens Olson & Bear LLP

(57) ABSTRACT

According to one embodiment, a power management module in an information processing apparatus is configured to execute a process of setting a power-down signal to a peripheral device in an active state in response to a power-down signal generation command, a process of setting the information processing apparatus in a sleep state in response to a sleep state transition request signal, a process of restoring the information processing apparatus to a working state in response to generation of a predetermined wakeup event, and a process of setting the power-down signal in an inactive state before a predetermined time has passed since the restoration of the information processing apparatus to the working state.

11 Claims, 4 Drawing Sheets

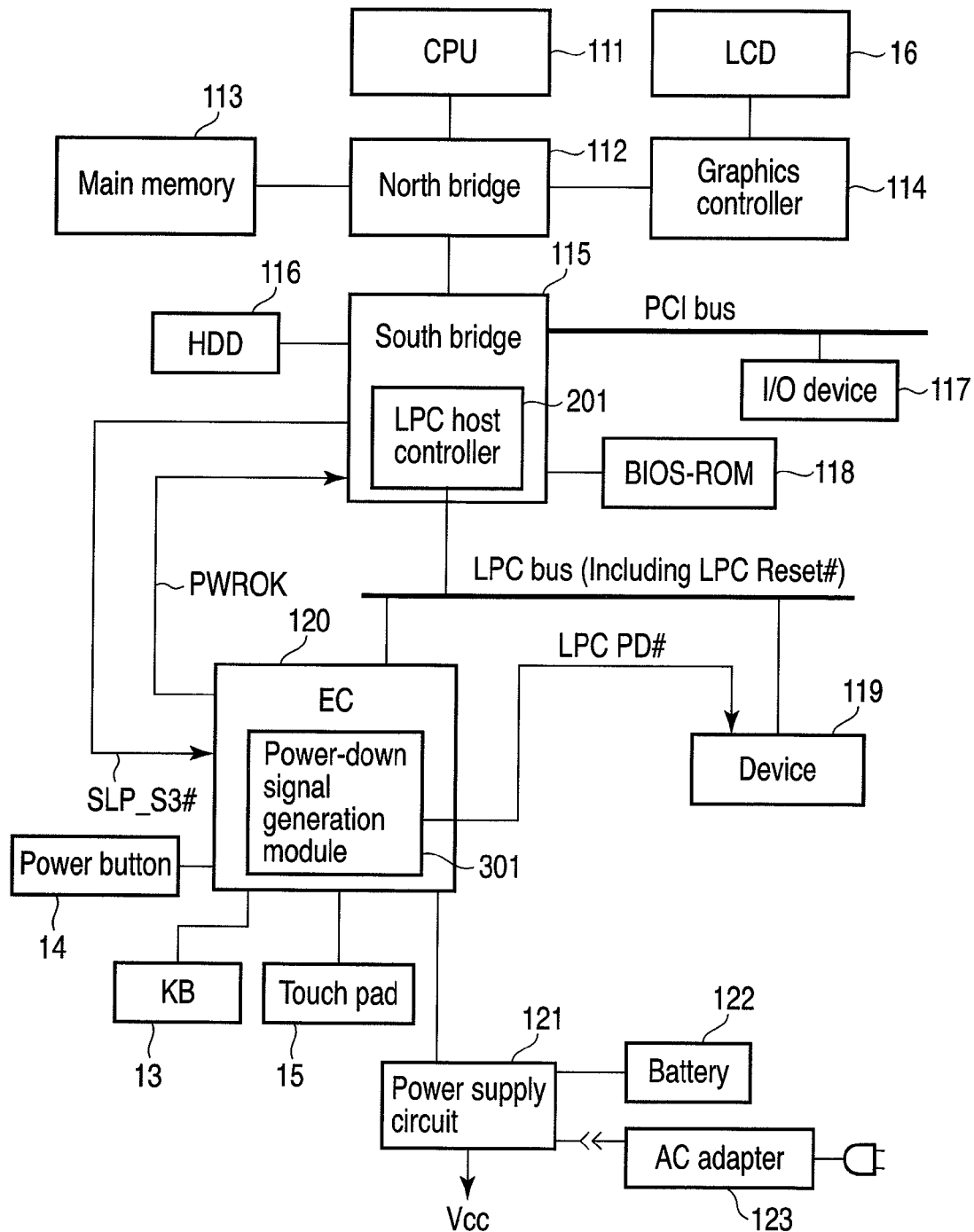
F I G. 2

INFORMATION PROCESSING APPARATUS AND POWER-SAVING CONTROL METHOD

CROSS-REFERENCE TO RELATED APPLICATIONS

This application is based upon and claims the benefit of priority from Japanese Patent Application No. 2009-109799, filed Apr. 28, 2009, the entire contents of which are incorporated herein by reference.

BACKGROUND

1. Field

One embodiment of the invention relates to an information processing apparatus such as a personal computer, and a power-saving control method which is applied to the information processing apparatus.

2. Description of the Related Art

In recent years, in information processing apparatuses such as personal computers, various kinds of buses, such as a PCI (Peripheral Component Interconnect) bus and an LPC (Low Pin Count) bus, have been used. In a certain kind of bus, not only signals which need to be supported as standard signals, but also some option signals which need to be supported only where necessary, are stipulated. For example, in the LPC bus standard, a power-down signal is stipulated as one of option signals. The power-down signal is a signal which is used in order to instruct a peripheral device on the LPC bus to prepare for power-off. For example, a peripheral device, which needs to execute a predetermined process prior to power-off, requires the input of the power-down signal.

In usual cases, the LPC bus is used for interconnection between a controller (chipset) and peripheral devices. However, in the current situation, only limited types of controllers have the function of outputting an option signal such as a power-down signal, and there are many types of controllers which do not support the output of the power-down signal.

In the system configuration using a controller which does not support the output of a power-down signal, it is difficult to normally operate the function of a peripheral device which requires the input of a power-down signal. Thus, in a computer including a controller which does not support the output of a power-down signal, it is necessary to treat the peripheral device which requires the input of a power-down signal as a non-supported device.

Jpn. Pat. Appln. KOKAI Publication No. 2002-236529 discloses a system for executing power-saving control for a graphics controller which does not have a pin for power-saving control. In this system, the system BIOS directly accesses an I/O register of a graphics controller, and controls the operation of hardware components in the graphics controller.

In this system, however, no consideration is given to the scheme for supporting a peripheral device which requires the input of an option signal such as a power-down signal.

In order to enabling the system configuration, which uses a controller that does not support the output of a power-down signal, to support a peripheral device which requires the input of a power-down signal, it is necessary to realize a novel function for controlling the generation timing of a power-down signal without using the controller.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing the system configuration of the information processing apparatus according to the embodiment;

DETAILED DESCRIPTION

Various embodiments according to the invention will be described hereinafter with reference to the accompanying drawings. In general, according to one embodiment of the invention, there is provided an information processing apparatus comprising: a nonvolatile memory configured to store a system program for generating a power-down signal generation command in response to a sleep state transition request from an operating system and for generating a sleep state transition command after generating the power-down signal generation command; a processor configured to execute the operating system and the system program; a controller connected to a peripheral device via a bus including at least a data line and a reset signal line, and configured to reset the peripheral device in response to the sleep state transition command, to transmit a sleep state transition request signal after the peripheral device is reset, and to release the reset of the peripheral device after a predetermined time has passed since restoration of the information processing apparatus from a sleep state to a working state; and a power management module configured to set a power-down signal to the peripheral device in an active state in response to the power-down signal generation command, to set the information processing apparatus in the sleep state in response to the sleep state transition request signal from the controller, to restore the information processing apparatus to the working state in response to generation of a predetermined wakeup event, and to set the power-down signal in an inactive state before the predetermined time has passed since the restoration of the information processing apparatus to the working state.

Figure 1:
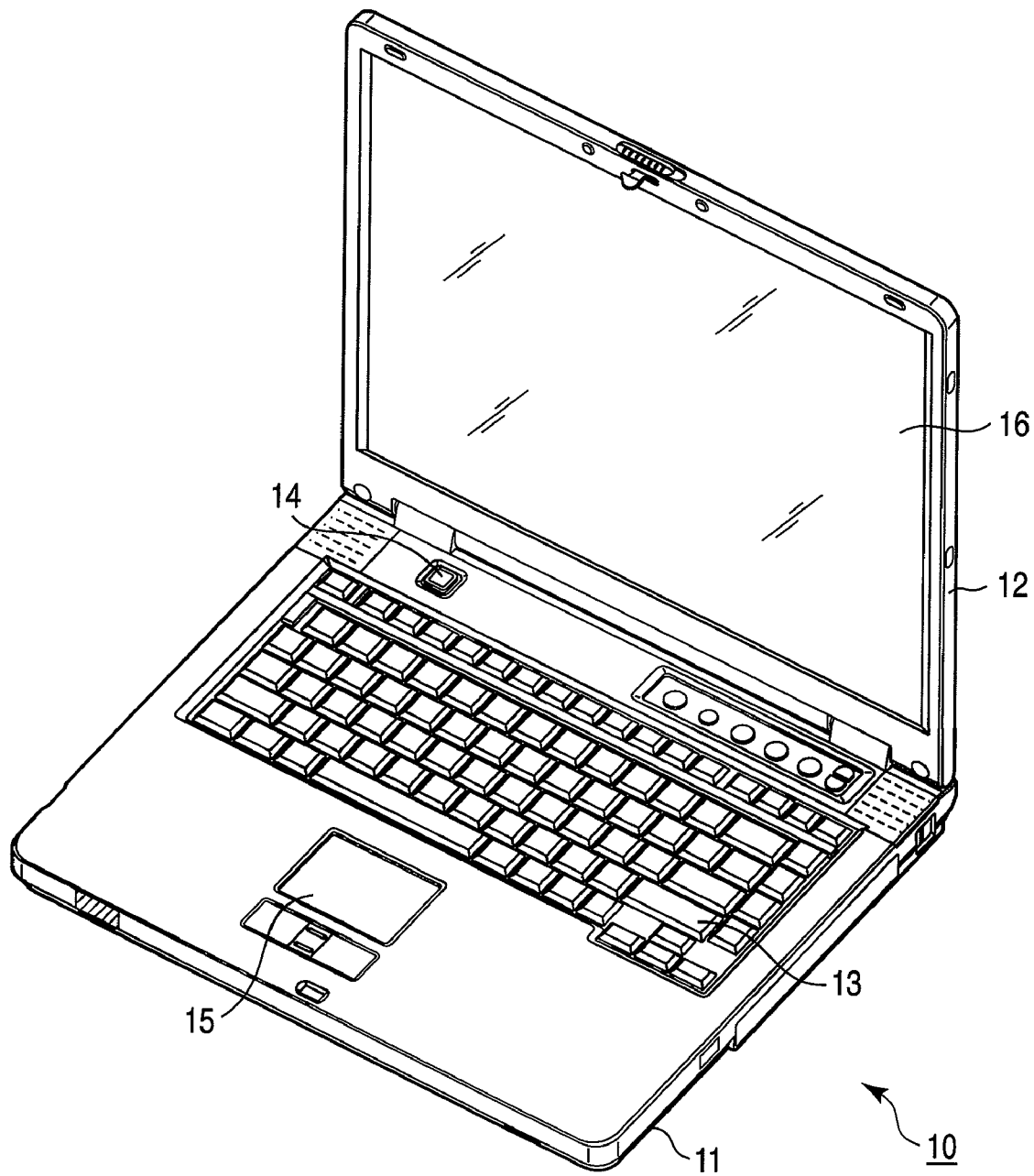
FIG. 1 is an exemplary perspective view showing the external appearance of an information processing apparatus according to an embodiment of the invention.

To begin with, referring to FIG. 1, the structure of an information processing apparatus according to the embodiment of the invention is described. The information processing apparatus is realized, for example, as a battery-powerable portable notebook personal computer 10. FIG. 1 is a perspective view showing the computer 10, as viewed from the front side, in the state in which a display unit thereof is opened. The computer 10 comprises a computer main body 11 and a display unit 12. A display device that is composed of an LCD (Liquid Crystal Display) 16 is built in the display unit 12.

The display unit 12 is supported and attached to the computer main body 11 such that the display unit 12 is freely rotatable between an open position where a top surface of the computer main body 11 is exposed and a closed position where the top surface of the computer main body 11 is covered by the display unit 12. The computer main body 11 has a thin box-shaped casing. A keyboard 13, a power button 14 for powering on/off the computer 10, and a touch pad 15 are disposed on the top surface of the computer main body 11.

The computer 10 has a working state and a sleep state. In the sleep state, for example, almost all devices, other than some specific devices such as a main memory, are powered off.

FIG. 2 shows the system configuration of the computer 10. The computer 10 comprises a CPU 111, a north bridge 112, a main memory 113, a graphics controller 114, a south bridge 115, a hard disk drive (HDD) 116, an I/O device 117 which is connected to a PCI bus, a BIOS-ROM 118, a peripheral device 119 which is connected to an LPC bus, an embedded controller (EC) 120, and a power supply circuit 121.

The CPU 111 is a processor which controls the operation of the components of the computer 10. The CPU 111 executes various software which is loaded from the HDD 116 into the main memory 113, such as an operating system (OS) 201 and an application program. The CPU 111 also executes a BIOS (Basic Input/Output System) which is stored in the BIOS-ROM 118 which is a nonvolatile memory. The BIOS is a system program for hardware control. The BIOS has a function for executing power management of the computer 10, and executes, in cooperation with the embedded controller (EC) 120, a process of transitioning the system state of the computer 10 between the working state and the sleep state in which power consumption is smaller than in the working state. As the sleep state, use may be made of a suspend state (also referred to as "standby state") or a hibernation state (also referred to as "hibernate state"). In addition, the BIOS has a function of controlling the generation timing of a power-down signal LPCPD# which the peripheral device 119 requires. The power-down signal LPCPD# indicates that the peripheral device 119 is to prepare for power-off. The power-down signal LPCPD# is a low-active signal.

The north bridge 112 is a bridge device which connects a local bus of the CPU 111 and the south bridge 115. The north bridge 112 has a function of executing communication with the graphics controller 114. Further, the north bridge 112 includes a memory controller which controls the main memory 113. The graphics controller 114 is a display controller for controlling the LCD 16 that is used as a display monitor of the computer 10.

The south bridge 115 is connected to a PCI (Peripheral Component Interconnect) bus and an LPC (Low Pin Count) bus. The LPC bus includes at least a data line and a reset signal line. For example, the data line is composed of a 4-bit width command/address/data signal lines. The LPC bus further includes a frame signal line. The command/address/data signal lines are, for example, a bus for transmitting a command, address and data which are multiplexed. The frame signal line is used for transmitting a frame signal for indicating the start and end of a bus cycle. The reset signal line is used for transmitting a reset signal LPC Reset# for resetting the peripheral device 119. The reset signal LPC Reset# is a low-active signal.

The south bridge 115 functions as a controller for controlling the peripheral device 119 on the LPC bus. An LPC host controller 201 is provided in the south bridge 115. The LPC host controller 201 is configured to execute communication with the peripheral device 119 via the LPC bus. The above-described power-down signal LPCPD# is an option signal of the LPC bus. In the present embodiment, a controller which does not support the output of the power-down signal LPCPD# is used as the south bridge 115. Specifically, the LPC host controller 201 does not have the function of outputting the power-down signal LPCPD#. Thus, the LPC bus, which connects the south bridge 115 and peripheral device 119, does not include the power-down signal LPCPD#.

The peripheral device 119 is a device which requires the input of the power-down signal LPCPD#. When the power-down signal LPCPD# is set in an active state, the peripheral device 119 can execute a predetermined preparation process for preparing for power-off. As the peripheral device 119, use is made of, for instance, a TPM (Trusted Platform Module) device for executing a security function. In this case, the peripheral device 119 executes a process of encrypting predetermined data, and a process of managing a key which has been used for data encryption. When the power-down signal LPCPD# is set in the active state, the peripheral device 119 executes a predetermined preparation process for preparing for power-off. In the preparation operation, for example, a process for stopping the internal operation of the peripheral device 119 is executed. In addition, in the preparation process, it is possible to execute, for example, a process of storing internal data of the peripheral device 119 in a nonvolatile memory which is provided in the peripheral device 119. Thereby, even in the case where the system state has transitioned to a sleep state such as a suspend state, it is possible to prevent necessary internal data (e.g. a key) from being lost. Needless to say, the peripheral device 119, which requires the input of the power-down signal LPCPD#, is not limited to the TPM device, and use may be made of an arbitrary device which is configured to execute some process in response to the power-down signal LPCPD# from the host.

In the present embodiment, a function of controlling the generation of the power-down signal LPCPD# is provided in the embedded controller (EC) 120, in order to make it possible to support the peripheral device 119 having an input pin for inputting the power-down signal LPCPD#, that is, the peripheral device 119 which requires the input of the power-down signal LPCPD#. The peripheral device 119 has four input/output pins for inputting/outputting a command/address/data signal in a time-division manner, an input pin for receiving a frame signal, an input pin for receiving the reset signal LPC Reset#, and an input pin for receiving the power-down signal LPCPD#. The four input/output pins, the input pin for receiving the frame signal and the input pin for receiving the reset signal LPC Reset# are connected to the south bridge 115 via the LPC bus. On the other hand, the input pin for receiving the power-down signal LPCPD# is connected to the embedded controller (EC) 120 via a power-down signal LPCPD# line.

The embedded controller (EC) 120 is a power management controller for executing power management of the computer, and is realized, for example, as a 1-chip microcomputer which incorporates a keyboard controller for controlling the keyboard (KB) 13 and touch pad 15. The EC 120 cooperates with the power supply circuit 121 to power on/off the computer 10 in response to the user's operation of the power button switch 14. The power supply circuit 121 uses power from a battery 122 which is built in the computer main body 11 or external power which is supplied via an AC adapter 123, thereby generating system power that is to be supplied to the respective components of the computer 10.

The EC 120 is connected to the south bridge 115, for example, via the above-described LPC bus. The EC 120 includes a power-down signal generation module 301. The power-down signal generation module 301 is a circuit which drives the power-down signal LPCPD# line, thereby setting the power-down signal LPCPD# in the active/inactive state. The EC 120 includes registers which are accessible by the CPU 111, and communication with the BIOS can be executed via the registers. In addition, the EC 120 includes a function of reporting the state of the system power to the south bridge 115 by using a signal PWROK which indicates that the system power is stable. Furthermore, the EC 120 has a function of receiving a sleep state transition request signal SLP_S3# which is sent from the south bridge 115.

Figure 3:
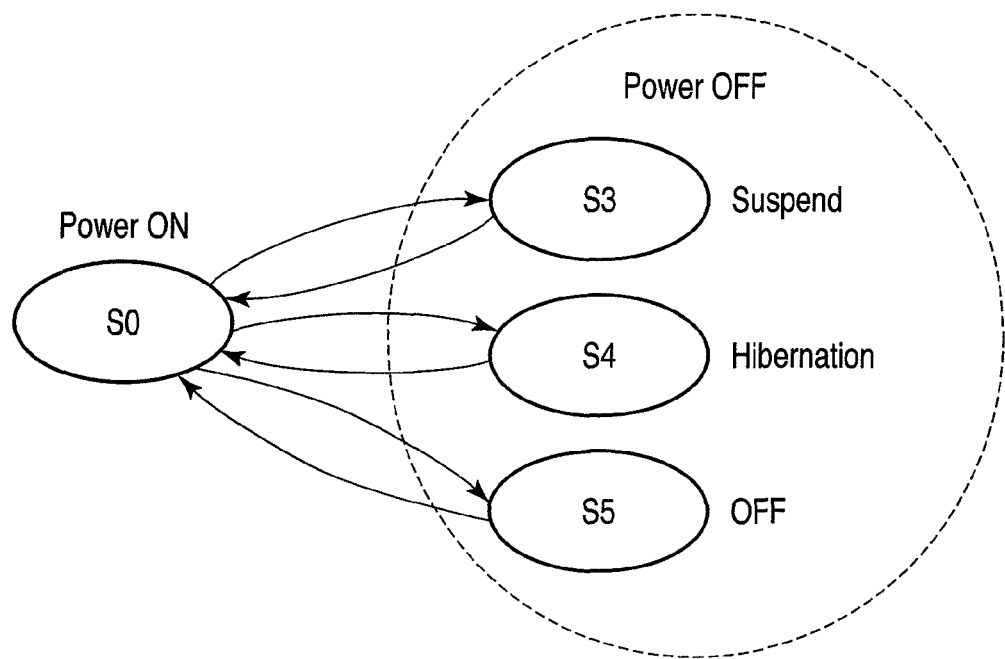
FIG. 3 is an exemplary view for explaining the transition of the system state of the information processing apparatus according to the embodiment.

FIG. 3 illustrates the transition of the system state of the computer 10. The computer 10 supports four system states S0, S3, S4 and S5. S0 is the working state in which the computer 10 is powered on. S3 (suspend) and S4 (hibernation) are sleep states (also referred to as "power save states"). S5 is the off state.

In S3 (suspend), almost all devices, other than the main memory 113 and EC 120, are powered off. The south bridge 115 may have a function for detecting a wakeup request. In this case, in S3 (suspend), a part or all of the modules in the south bridge 115 may be kept in the power-on state. In S4 (hibernation), the system context is saved in the HDD 116, and almost all devices, other than the EC 120, are powered off. In S4 (hibernation), too, a part or all of the modules in the south bridge 115 may be kept in the power-on state.

The outline of the power management function of the computer 10 will now be described. To begin with, a description is given of the outline of the operation which is executed when the system state is transitioned from the working state to the sleep state.

When the BIOS has received a sleep state transition request which is sent from the OS, the BIOS sends a sleep state transition command to the south bridge 115, and causes the south bridge 115 to prepare for transition to the sleep state. The south bridge 115 executes a predetermined preparation process. In the preparation process, for example, the south bridge 115 resets the peripheral device 119 by setting the reset signal LPC Reset# in the LPC bus in the active state, so that the peripheral device 119 can safely be powered off. The reset signal LPC Reset# is set in the low level, whereby the operation of the peripheral device 119 is stopped. In this state, that is, in the state in which the operation of the peripheral device 119 is stopped, power supply to the peripheral device 119 is stopped, and thereby the peripheral device 119 can safely be powered off.

After the predetermined preparation process has been executed, the south bridge 115 sends a sleep state transition request signal to the embedded controller (EC) 120, thereby permitting the embedded controller (EC) 120 to set the system state to the sleep state. In the case where S3 is used as the sleep state, a sleep state transition request signal SLP_S3# is sent from the south bridge 115 to the embedded controller (EC) 120. When the embedded controller (EC) 120 has received the sleep state transition request signal SLP_S3#, the embedded controller (EC) 120 sets the system state to the sleep state S3, by turning off almost all devices (e.g. CPU 111, north bridge 112, graphics controller 115 and peripheral device 119) other than the main memory 113.

After the peripheral device 119 is reset, the peripheral device 119 cannot execute any of the operations including reception of an input signal. Thus, before the peripheral device 119 is reset, it is necessary to render active the power-down signal LPCPD# in order to inform the peripheral device 119 that the peripheral device 119 is to be powered off. For this purpose, in the present embodiment, the BIOS sends a power-down signal generation command to the EC 120 before sending the sleep state transition command to the south bridge 115. Specifically, in the case where the BIOS has received the sleep state transition request which is sent from the OS, the BIOS first sends a power-down signal generation command to the EC 120 and, after power-down signal generation command has been sent, the BIOS sends a sleep state transition command to the south bridge 115. In this case, the sleep state transition command may be generated after a predetermined wait time, which depends on the system configuration, has passed since the sending of the power-down signal generation command. Upon receiving the power-down signal generation command from the BIOS, the EC 120 controls the power-down signal generation module 301, and sets the power-down signal LPCPD# in the active state. Thereby, before the peripheral device 119 is reset by the reset signal LPC Reset# from the south bridge 115, the peripheral device 119 can normally be informed that the peripheral device 119 is to prepare for power-off.

Next, a description is given of the outline of the operation which is to be executed when the system state is restored from the sleep state to the working state.

When a wakeup event, such as an operation of the power button switch 14, has occurred during the period in which the system is in the sleep state, the EC 120 powers on the system of the computer 10 and restores the system state of the computer 10 from the sleep state to the working state. Devices, such as the CPU 111, north bridge 112, graphics controller 115 and peripheral device 119, are powered on. In the meantime, the south bridge 115 may detect the generation of a wakeup request. When the south bridge 115 has detected the generation of the wakeup request, the south bridge 115 sets the sleep state transition request signal SLP_S3# in the inactive state. The setting of the sleep state transition request signal SLP_S3# in the inactive state may be used as one of wakeup events. After a predetermined time T has passed since the restoration of the system state to the working state, the south bridge 115 sets the reset signal LPC Reset# in the inactive state in order to resume the operation of the peripheral device 119, thereby releasing the reset of the peripheral device 119. The value of the predetermined time T is preset according to the specifications of the south bridge 115.

If the power-down signal LPCPD# remains in the active state when the reset of the peripheral device 119 is released, it would be possible that the peripheral device 119 may erroneously start once again the process for preparing for power-off. It is thus necessary to set the power-down signal LPCPD# in the inactive state before the reset of the peripheral device 119 is released. In addition, it is desirable that all input signals to the peripheral device 119 be at the low level during the period in which the peripheral device 119 is powered off. It is necessary, therefore, to set the power-down signal LPCPD# in the inactive state at a time in a time period from the power-on of the peripheral device 119 to the release of the reset of the peripheral device 119. Immediately after the system state restores to the working state, the CPU 111 has not yet start to operate. Thus, the BIOS cannot control the power-down signal LPCPD#. Therefore, in the present embodiment, the EC 120 itself executes the process of setting the power-down signal LPCPD# in the inactive state. Specifically, when a wakeup event has occurred, the EC 120 executes (1) a process of powering on the system and restoring the system state from the sleep state to the working state, and (2) a process of setting the power-down signal LPCPD# in the inactive state before the above-described predetermined time T has passed since the restoration to the working state.

Figure 4:
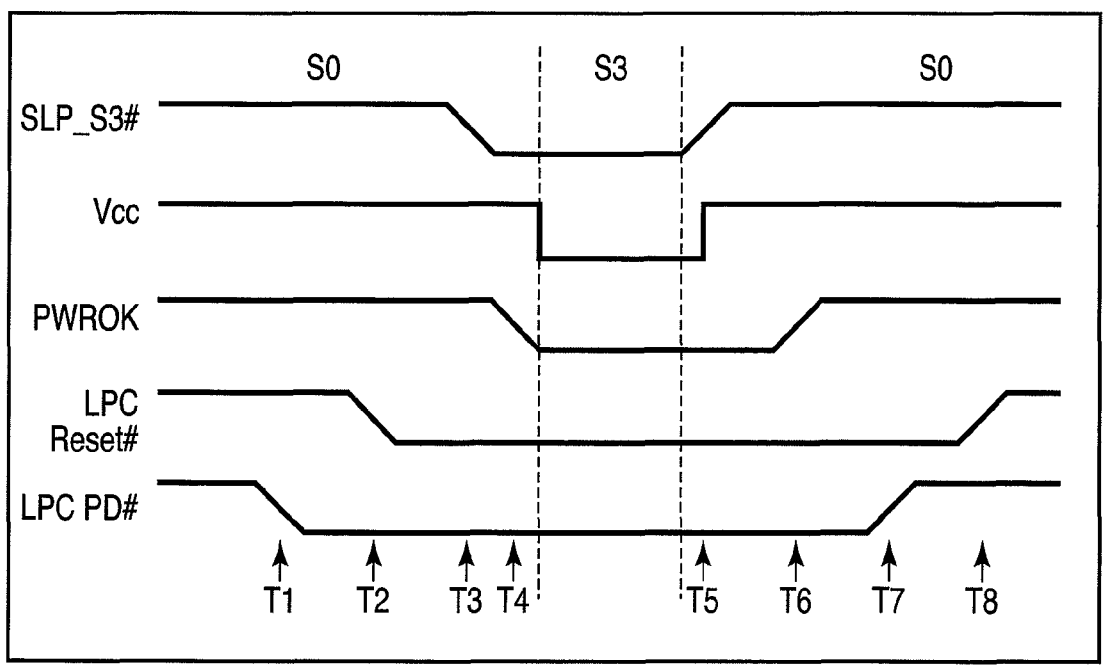
FIG. 4 is an exemplary timing chart illustrating a power-down signal control operation which is executed by information processing apparatus according to the embodiment.

Next, referring to a timing chart of FIG. 4, the power-down signal control operation, which is executed by the computer 10, is described.

FIG. 4 shows the timing sequence corresponding to the state transition (S0→S3→S0) of the system. In FIG. 4, symbol "#", which is added to the right end of the signal name, indicates that the signal of this signal name is a negative logic (low-active) signal.

When the system transitions to the S3 state, the following process is executed. In the description below, the term "assert" means to set a signal in an active state, and the term "de-assert" means to set a signal in an inactive state.

(1) If the BIOS receives an S3 transition request from the OS, the BIOS sends a power-down signal generation command to the EC 120. When the EC has received the power-down signal generation command, that is, at the timing of T1, the EC 120 asserts the LPCPD# signal (LPCPD#=low level). The peripheral device 119 starts the preparation process for preparing for power-off.

(2) The BIOS sends a sleep state transition command, which requests transition to S3, to the south bridge 115. At the timing of T2, the LPC host controller 201 in the south bridge 115 asserts the LPC Reset# signal in the LPC bus (LPC Reset#=low level). At the timing of T3, the south bridge 115 asserts the SLP_S3# signal.

(3) The EC 120 detects that the SLP_S3# signal has been asserted. As a result, at the timing of T4, the EC 120 powers off the various devices, and de-asserts a PWROK signal which indicates that the system power is stable. The peripheral device 119 is powered off in the state in which both the LPC Reset# signal and LPCPD# signal are set at the low level.

When the system transitions from the S3 state to the S0 state, the following process is executed.

(4) When a wakeup request has occurred in the S3 state, the south bridge 115 issues a request for transition to the S0 state to the EC 120. The SLP_S3# signal is usable as a scheme of the request. At the timing of T5, the south bridge 115 de-asserts the SLP_S3# signal, thereby requesting the EC 120 to transition to the S0 state.

(5) The EC 120 powers on the various devices, and asserts the PWROK signal at the timing of T6. By the assertion of the PWROK signal, the south bridge 115 recognizes that the system has restored to the S0 state.

(6) The time from T6 to T8 is the above-described predetermined time, and is defined in advance according to the specifications of the south bridge 115. In order to disable the LPCPD# signal at a time in the period between T6 and T8, the EC 120 de-asserts the LPCPD# signal at the timing of T7.

(7) After the predetermined time T has passed since the assertion of the PWROK signal (at the timing of T8), the south bridge 115 de-asserts the LPC Reset# signal.

In the present embodiment, by the procedure of (1), the LPCPD# signal can be set in the active state before the peripheral device 119 is reset. By the procedure of (6), the LPCPD# signal can be set in the inactive state before the reset of the peripheral device 119 is released.

Figure 5:
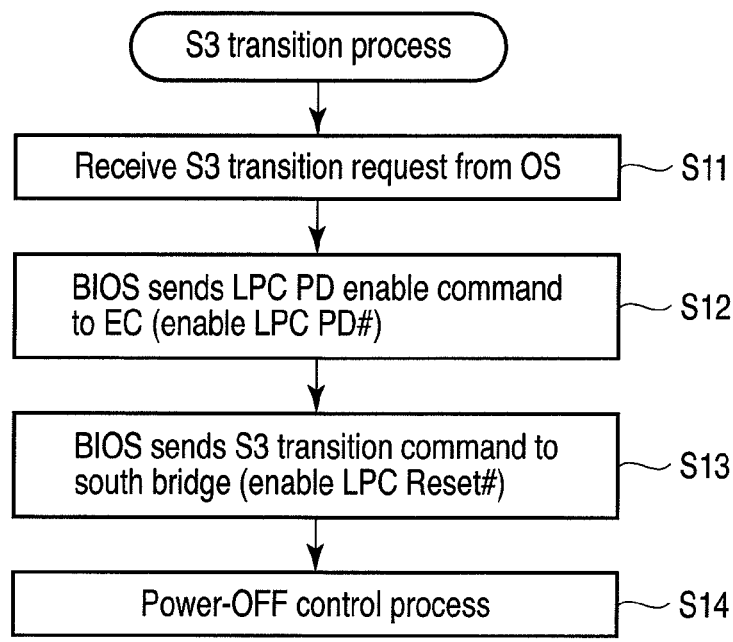
FIG. 5 is an exemplary flow chart illustrating the procedure of a sleep state transition process which is executed by information processing apparatus according to the embodiment.

Next, referring to a flow chart of FIG. 5, a description is given of the procedure of the power-saving control process which is executed when the S3 transition process is executed.

When a sleep state transition request event has been generated in the S0 state by, e.g. a user operation, the OS sends a sleep state transition request (S3 transition request) to the BIOS. When the BIOS has received the S3 transition request (step S11), the BIOS first sends a power-down signal generation command to the EC 120 (step S12). The EC 120 controls the power-down signal generation module 301, and asserts the power-down signal LPCPD# in order to inform the peripheral device 21 that the peripheral device 21 is to prepare for power-off. After the power-down signal generation command has been sent, the BIOS sends a sleep state transition command (S3 transition command) to the south bridge 115, and causes the south bridge 115 to prepare for transition to the sleep state (step S13). The south bridge 115 starts a predetermined preparation process. Specifically, the south bridge 115 asserts the reset signal LPC Reset# in the LPC bus to reset the peripheral device 21. Thereafter, the south bridge 115 asserts the SLP_S3 signal to the EC 120, and permits the EC 120 to set the system state to the S3 state. The EC 120 sets the system state to the sleep state S3, by turning off almost all devices (e.g. CPU 111, north bridge 112, graphics controller 115 and peripheral device 119) other than the main memory 113.

Figure 6:
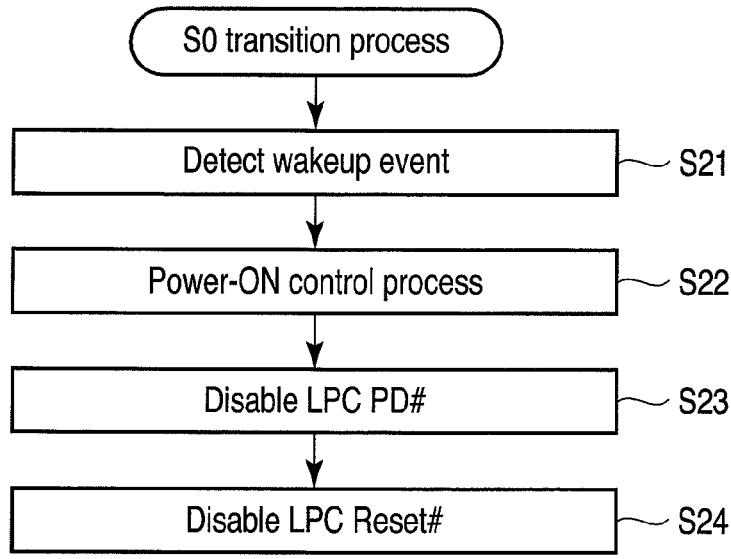
FIG. 6 is an exemplary flow chart illustrating the procedure of a working state transition process which is executed by information processing apparatus according to the embodiment.

Next, referring to a flow chart of FIG. 6, a description is given of the procedure of the power-saving control process which is executed when the S0 transition process is executed.

If the EC 120 detects the occurrence of a wakeup event during the S3 (step S21), the EC 120 powers on the system and restores the system state from the S3 state to the S0 state (step S22). In step S22, the EC 120 also executes a process of informing, by the PWROK signal, the south bridge 115 that the system state has restored to the S0 state. The EC 120 controls the power-down signal generation module 301 and de-asserts the power-down signal LPCPD# (step S23). After the predetermined time T has passed since the restoration of the system state to the S0 state, the south bridge 115 de-asserts the reset signal LPC Reset# to release the reset of the peripheral device 119 (step S24).

As has been described above, in the present embodiment, the EC 120, which functions as the power management module, is provided with the function of generating the power-down signal LPCPD#. When the system is to transition to the sleep state, the BIOS generates the power-down signal generation command, prior to generating the sleep state transition command. Thus, the EC 120 can set the power-down signal LPCPD# in the active state before the peripheral device 119 is reset by the south bridge 115. In addition, when a predetermined wakeup event has occurred, the EC 120 executes the process of restoring the system state to the working state and the process of setting the power-down signal LPCPD# in the inactive state. Thus, the power-down signal LPCPD# can be rendered inactive before the reset of the peripheral device 119 is released by the south bridge 115. Therefore, the generation timing of the power-down signal can be controlled without using a controller which supports the output of the power-down signal.

In the present embodiment, the control of the power-down signal LPCPD# of the LPC bus has been described. However, the power-down signal generation control function of the embodiment is applicable to an arbitrary bus in which a power-down signal is stipulated as an option signal.

In addition, in the present embodiment, the power-saving control process, which corresponds to the case of using the S3 state as the sleep state, has mainly been described. However, the procedure of the power-saving control process of the embodiment is applicable to the transition from the S0 state to the S4 state, and to the transition from the S4 state to the S0 state.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a nonvolatile memory configured to store a system program for generating a power-down signal generation command in response to reception of a sleep state transition request from an operating system and for generating a sleep state transition command after generating the power-down signal generation command;
a processor configured to execute the operating system and the system program;
a controller connected to a peripheral device via a bus comprising at least a data line and a reset signal line, and configured to reset the peripheral device in response to reception of the sleep state transition command, and to output a sleep state transition request signal after resetting the peripheral device; and
a power management module configured to set a power-down signal to the peripheral device in an active state in response to reception of the power-down signal generation command, and to set the information processing apparatus in the sleep state in response to reception of the sleep state transition request signal from the controller.

2. The information processing apparatus of claim 1, wherein the power management module is configured to set the information processing apparatus in the sleep state by turning off at least the processor and the peripheral device.

3. The information processing apparatus of claim 1, wherein the power-down signal is a signal for informing the peripheral device that the peripheral device is to prepare for shutdown.

4. The information processing apparatus of claim 1, wherein the peripheral device comprises an input pin for receiving the power-down signal, and the input pin is connected to the power management module via a signal line.

5. The information processing apparatus of claim 1, wherein the controller is configured to release resetting of the peripheral device after a predetermined time has passed since restoration of the information processing apparatus from the sleep state to a working state; and
the power management module is configured to restore the information processing apparatus to the working state in response to generation of a predetermined wakeup event, and to set the power-down signal in an inactive state before the predetermined time has passed since the restoration of the information processing apparatus to the working state.

6. The information processing apparatus of claim 5, wherein the power management module is configured to set the information processing apparatus in the sleep state by turning off at least the processor and the peripheral device, and to restore the information processing apparatus to the working state by turning on the processor and the peripheral device in response to generation of the predetermined wakeup event.

7. The information processing apparatus of claim 5, wherein the power management module is configured to notify the controller that the information processing apparatus is restored to the working state.

8. The information processing apparatus of claim 5, wherein the power-down signal is a signal for informing the peripheral device that the peripheral device is to prepare for shutdown.

9. The information processing apparatus of claim 5, wherein the peripheral device comprises an input pin for receiving the power-down signal, and the input pin is connected to the power management module via a signal line.

10. A power-saving control method of controlling an operation of an information processing apparatus comprising a peripheral device connected to a bus comprising at least a data line and a reset signal line, a controller configured to control the peripheral device via the bus, and a power management module, the method comprising:
transmitting a power-down signal generation command to the power management module in response to reception of a sleep state transition request from an operating system, and transmitting a sleep state transition command to the controller after transmitting the power-down signal generation command;
setting a power-down signal to the peripheral device in an active state by the power management module in response to reception of the power-down signal generation command;
resetting the peripheral device by the controller in response to reception of the sleep state transition command, and sending a sleep state transition request signal from the controller to the power management module after resetting the peripheral device;
setting the information processing apparatus in a sleep state by the power management module in response to reception of the sleep state transition request signal;
restoring the information processing apparatus to a working state by the power management module in response to generation of a predetermined wakeup event, and setting the power-down signal in an inactive state; and
releasing the resetting of the peripheral device by the controller after a predetermined time has passed since the restoration of the information processing apparatus from the sleep state to the working state.

11. An information processing apparatus comprising:
a controller connected to a peripheral device via a bus comprising at least a data line and a reset signal line, and configured to release resetting of the peripheral device after a predetermined time has passed since restoration of the information processing apparatus from a sleep state to a working state; and
a power management module connected to the peripheral device via a power-down signal line, and configured to restore the information processing apparatus to the working state in response to generation of a predetermined wakeup event, and to set a power-down signal to the peripheral device in an inactive state before the predetermined time has passed since the restoration of the information processing apparatus to the working state.

* * * * *